(12) United States Patent
Strelec et al.

(10) Patent No.: US 10,521,867 B2
(45) Date of Patent: Dec. 31, 2019

(54) DECISION SUPPORT SYSTEM BASED ON ENERGY MARKETS

(71) Applicant: Honeywell International Inc., Morris Plains, NJ (US)

(72) Inventors: Martin Strelec, Chodov (CZ); Karel Macek, Prague (CZ); Radek Fisera, Mnichovice (CZ)

(73) Assignee: Honeywell International Inc., Morris Plains, NJ (US)

( * ) Notice: Subject to any disclaimer, the term of this patent is extended or adjusted under 35 U.S.C. 154(b) by 790 days.

(21) Appl. No.: 15/096,253

(22) Filed: Apr. 11, 2016

(65) Prior Publication Data

US 2016/0275630 A1   Sep. 22, 2016

Related U.S. Application Data

(63) Continuation of application No. 13/621,195, filed on Sep. 15, 2012, now abandoned.

(51) Int. Cl.
 *G06Q 50/06* (2012.01)
 *G06Q 30/02* (2012.01)
 *G06Q 40/04* (2012.01)

(52) U.S. Cl.
 CPC ......... *G06Q 50/06* (2013.01); *G06Q 30/0202* (2013.01); *G06Q 40/04* (2013.01); *G06Q 30/02* (2013.01)

(58) Field of Classification Search
 None
 See application file for complete search history.

(56) References Cited

U.S. PATENT DOCUMENTS

| | | |
|---|---|---|
| 4,110,827 A | 8/1978 | Shavit |
| 4,130,874 A | 12/1978 | Pai |

(Continued)

FOREIGN PATENT DOCUMENTS

| | | | | |
|---|---|---|---|---|
| EP | 2456227 | 5/2012 | | |
| JP | 2003-248773 | * 9/2003 | ............. | G06Q 50/00 |

(Continued)

OTHER PUBLICATIONS

"Executive Summary," 1 page, prior to Sep. 2007.

(Continued)

*Primary Examiner* — Olabode Akintola

(57) ABSTRACT

A system for purchasing and selling power that fairly accommodates sellers and buyers. For instance, a submarket may be formed between a utility company or retailer and its consumer or customer. The utility or retailer may eliminate differences between generated or purchased power and demanded power. Mechanisms used for elimination of power differences may incorporate utilizing power from ancillary services, purchasing or selling power on the spot market, and affecting a demand for power with demand response programs. A difference between purchased power and demanded power may be minimized by forming an optimal power stack having a mix of power of the demand response program, power at the spot market and/or power of ancillary services. An optimization sequence may be implemented to minimize the difference between the purchased power and demanded power, and to maximize profit.

7 Claims, 14 Drawing Sheets

(56) References Cited

U.S. PATENT DOCUMENTS

| | | |
|---|---|---|
| 4,153,936 A | 5/1979 | Schmitz et al. |
| 4,419,667 A | 12/1983 | Gurr et al. |
| 4,850,010 A | 7/1989 | Stanbury et al. |
| 4,937,760 A | 6/1990 | Beitel et al. |
| 5,341,142 A | 8/1994 | Reis et al. |
| 5,500,561 A | 3/1996 | Wilhelm |
| 5,566,084 A | 10/1996 | Cmar |
| 5,572,438 A | 11/1996 | Ehlers et al. |
| 5,598,349 A | 1/1997 | Elliason et al. |
| 5,719,854 A | 2/1998 | Choudhury et al. |
| 5,822,553 A | 10/1998 | Gifford et al. |
| 5,892,758 A | 4/1999 | Argyroudis |
| 6,026,375 A | 2/2000 | Hall et al. |
| 6,195,367 B1 | 2/2001 | Jakobik et al. |
| 6,209,018 B1 | 3/2001 | Ben-shachar et al. |
| 6,252,950 B1 | 6/2001 | Duty et al. |
| 6,259,723 B1 | 7/2001 | Miyashita |
| 6,278,717 B1 | 8/2001 | Arsenault et al. |
| 6,289,384 B1 | 9/2001 | Whipple et al. |
| 6,366,926 B1 | 4/2002 | Pohlmann et al. |
| 6,446,136 B1 | 9/2002 | Pohlmann et al. |
| 6,519,509 B1 | 2/2003 | Nierlich et al. |
| 6,529,723 B1 | 3/2003 | Bentley |
| 6,535,817 B1 | 3/2003 | Krishnamurti et al. |
| 6,566,926 B1 | 5/2003 | Patterson |
| 6,574,581 B1 | 6/2003 | Bohrer et al. |
| 6,758,161 B2 | 7/2004 | Nohynek |
| 6,832,249 B2 | 12/2004 | Ciscon et al. |
| 6,857,022 B1 | 2/2005 | Scanlan |
| 6,865,685 B2 | 3/2005 | Hammond et al. |
| 6,985,087 B2 | 1/2006 | Soliman |
| 7,010,700 B1 | 3/2006 | Foss et al. |
| 7,016,784 B2 | 3/2006 | Allen et al. |
| 7,039,532 B2 | 5/2006 | Hunter |
| 7,069,309 B1 | 6/2006 | Dodrill et al. |
| 7,183,910 B2 | 2/2007 | Alvarez et al. |
| 7,260,616 B1 | 8/2007 | Cook |
| 7,333,880 B2 | 2/2008 | Brewster et al. |
| 7,337,237 B2 | 2/2008 | Salahshoor et al. |
| 7,346,467 B2 | 3/2008 | Bohrer et al. |
| 7,392,115 B2 | 6/2008 | Schindler |
| 7,401,086 B2 | 7/2008 | Chorafakis et al. |
| 7,472,301 B2 | 12/2008 | Ginggen et al. |
| 7,528,503 B2 | 5/2009 | Rognli et al. |
| 7,565,227 B2 | 7/2009 | Richard et al. |
| 7,590,746 B2 | 9/2009 | Slater et al. |
| 7,650,289 B2 | 1/2010 | Cooper et al. |
| 7,676,657 B2 | 3/2010 | Lindholm et al. |
| 7,702,424 B2 | 4/2010 | Cannon et al. |
| 7,715,951 B2 | 5/2010 | Forbes, Jr. et al. |
| 7,742,953 B2 | 6/2010 | King et al. |
| 7,775,191 B2 | 8/2010 | Hou |
| 7,778,738 B2 | 8/2010 | Taft |
| 7,797,009 B2 | 9/2010 | Kiiskila et al. |
| 7,806,845 B2 | 10/2010 | Ann et al. |
| 7,844,481 B2 | 11/2010 | Hilbush et al. |
| 7,845,576 B2 | 12/2010 | Siddaramanna et al. |
| 7,865,252 B2 | 1/2011 | Clayton |
| 7,873,441 B2 | 1/2011 | Synesiou et al. |
| 7,885,718 B2 | 2/2011 | Yano et al. |
| 7,886,166 B2 | 2/2011 | Shnekendorf et al. |
| 7,925,384 B2 | 4/2011 | Huizenga |
| 7,941,528 B2 | 5/2011 | Hicks, III et al. |
| 7,954,726 B2 | 6/2011 | Siddaramanna et al. |
| 7,958,229 B2 | 6/2011 | Conway |
| 8,000,913 B2 | 8/2011 | Kreiss et al. |
| 8,023,410 B2 | 9/2011 | O'Neill |
| 8,073,558 B2 | 12/2011 | Koch et al. |
| 8,091,794 B2 | 1/2012 | Siddaramanna et al. |
| 8,140,279 B2 | 3/2012 | Subbloie |
| 8,140,658 B1 | 3/2012 | Gelvin et al. |
| 8,143,811 B2 | 3/2012 | Shloush et al. |
| 8,163,276 B2 | 4/2012 | Hedrick et al. |
| 8,170,774 B2 | 5/2012 | Forte et al. |
| 8,183,995 B2 | 5/2012 | Wang et al. |
| 8,199,773 B2 | 6/2012 | Aubin et al. |
| 8,232,745 B2 | 7/2012 | Chemel et al. |
| 8,234,017 B2 | 7/2012 | Ahn |
| 8,234,876 B2 | 8/2012 | Parsonnet et al. |
| 8,260,468 B2 | 9/2012 | Ippolito et al. |
| 8,260,469 B2 | 9/2012 | Gregory et al. |
| 8,260,650 B2 | 9/2012 | Miller |
| 8,280,656 B2 | 10/2012 | Kreiss et al. |
| 8,291,243 B2 | 10/2012 | Castelli et al. |
| 8,295,989 B2 | 10/2012 | Rettger et al. |
| 8,305,380 B2 | 11/2012 | Gotwalt et al. |
| 8,312,299 B2 | 11/2012 | Tremel et al. |
| 8,321,302 B2 | 11/2012 | Bauer et al. |
| 8,321,950 B2 | 11/2012 | Oran |
| 8,327,024 B2 | 12/2012 | Pattison et al. |
| 8,330,762 B2 | 12/2012 | Grossman |
| 8,352,094 B2 | 1/2013 | Johnson et al. |
| 8,373,547 B2 | 2/2013 | Benya et al. |
| 8,386,086 B2 | 2/2013 | Roux et al. |
| 8,406,937 B2 | 3/2013 | Verfuerth et al. |
| 8,412,654 B2 | 4/2013 | Montalvo |
| 8,417,391 B1 | 4/2013 | Rombouts et al. |
| 8,443,355 B2 | 5/2013 | Wiese et al. |
| 8,565,903 B2 | 10/2013 | Koch et al. |
| 8,595,094 B1 | 11/2013 | Forbes, Jr. |
| 8,606,418 B1 | 12/2013 | Myers et al. |
| 8,621,097 B2 | 12/2013 | Venkatakrishnan et al. |
| 8,626,354 B2 | 1/2014 | Walter et al. |
| 8,630,744 B2 | 1/2014 | Walter et al. |
| 8,639,214 B1 | 1/2014 | Fujisaki |
| 8,676,273 B1 | 3/2014 | Fujisaki |
| 8,676,953 B2 | 3/2014 | Koch |
| 8,700,187 B2 | 4/2014 | Forbes, Jr. |
| 8,782,190 B2 | 7/2014 | Koch |
| 8,868,925 B2 | 10/2014 | Wyatt et al. |
| 8,879,488 B2 | 11/2014 | Pavlovski et al. |
| 8,880,226 B2 | 11/2014 | Raman et al. |
| 9,088,179 B2 | 7/2015 | Shaffer et al. |
| 9,124,535 B2 | 9/2015 | Koch |
| 9,137,050 B2 | 9/2015 | Koch |
| 9,153,001 B2 | 10/2015 | Walter et al. |
| 9,183,522 B2 | 11/2015 | Koch |
| 9,530,169 B2 | 12/2016 | Strelec et al. |
| 9,680,308 B2 | 6/2017 | Bruschi et al. |
| 9,805,325 B2 | 10/2017 | Ippolito et al. |
| 2003/0016237 A1 | 1/2003 | Hickey |
| 2003/0033230 A1 | 2/2003 | Mccall |
| 2003/0069752 A1 | 4/2003 | LeDain et al. |
| 2003/0233064 A1 | 12/2003 | Arm et al. |
| 2003/0233201 A1 | 12/2003 | Horst et al. |
| 2004/0034484 A1 | 2/2004 | Solomita, Jr. et al. |
| 2004/0137897 A1 | 7/2004 | Teixeira |
| 2004/0203649 A1 | 10/2004 | Cashiola |
| 2005/0027636 A1 | 2/2005 | Gilbert et al. |
| 2005/0152694 A1 | 7/2005 | Chown |
| 2005/0172304 A1 | 8/2005 | Tavares et al. |
| 2005/0194456 A1 | 9/2005 | Tessier et al. |
| 2005/0229220 A1 | 10/2005 | Fisher et al. |
| 2005/0262026 A1 | 11/2005 | Watkins |
| 2007/0005195 A1 | 1/2007 | Pasquale et al. |
| 2007/0055999 A1 | 3/2007 | Radom et al. |
| 2007/0124109 A1 | 5/2007 | Timko et al. |
| 2007/0222295 A1 | 9/2007 | Wareham et al. |
| 2008/0011864 A1 | 1/2008 | Tessier et al. |
| 2008/0046715 A1 | 2/2008 | Balazs et al. |
| 2008/0114638 A1 | 5/2008 | Colliau et al. |
| 2008/0167931 A1 | 7/2008 | Gerstemeier et al. |
| 2008/0177678 A1 | 7/2008 | Di Martini et al. |
| 2008/0195255 A1 | 8/2008 | Lutze et al. |
| 2008/0255760 A1 | 10/2008 | Rojicek et al. |
| 2008/0262848 A1 | 10/2008 | Shienbrood et al. |
| 2009/0027932 A1 | 1/2009 | Haines et al. |
| 2009/0046625 A1 | 2/2009 | Diener et al. |
| 2009/0187499 A1 | 7/2009 | Mulder et al. |
| 2009/0198384 A1 | 8/2009 | Ahn |
| 2009/0204977 A1 | 8/2009 | Tavares et al. |
| 2009/0249090 A1 | 10/2009 | Schmitz et al. |
| 2009/0271255 A1 | 10/2009 | Utter et al. |
| 2009/0281674 A1 | 11/2009 | Taft |

(56) References Cited

U.S. PATENT DOCUMENTS

| | | |
|---|---|---|
| 2009/0295594 A1 | 12/2009 | Yoon |
| 2009/0297488 A1 | 12/2009 | Fraser et al. |
| 2009/0313083 A1 | 12/2009 | Dillon et al. |
| 2009/0319090 A1 | 12/2009 | Dillon et al. |
| 2009/0319310 A1 | 12/2009 | Little |
| 2010/0057480 A1 | 3/2010 | Arfin et al. |
| 2010/0076615 A1 | 3/2010 | Daniel et al. |
| 2010/0076835 A1 | 3/2010 | Silverman |
| 2010/0106342 A1 | 4/2010 | Ko et al. |
| 2010/0106543 A1 | 4/2010 | Marti |
| 2010/0114340 A1 | 5/2010 | Huizenga et al. |
| 2010/0138363 A1 | 6/2010 | Batterberry et al. |
| 2010/0168924 A1 | 7/2010 | Tessier et al. |
| 2010/0179704 A1 | 7/2010 | Ozog |
| 2010/0241285 A1 | 9/2010 | Johnson et al. |
| 2010/0274377 A1 | 10/2010 | Kaufman et al. |
| 2010/0283606 A1 | 11/2010 | Tsypin et al. |
| 2010/0324962 A1 | 12/2010 | Nesler et al. |
| 2011/0016200 A1 | 1/2011 | Koch |
| 2011/0040550 A1 | 2/2011 | Graber et al. |
| 2011/0040666 A1 | 2/2011 | Crabtree et al. |
| 2011/0046805 A1 | 2/2011 | Bedros et al. |
| 2011/0093493 A1 | 4/2011 | Nair et al. |
| 2011/0113068 A1 | 5/2011 | Ouyang |
| 2011/0125542 A1 | 5/2011 | Koch |
| 2011/0172836 A1 | 7/2011 | Boss et al. |
| 2011/0172838 A1 | 7/2011 | Pai et al. |
| 2011/0196539 A1 | 8/2011 | Nair et al. |
| 2011/0196546 A1 | 8/2011 | Muller et al. |
| 2011/0199209 A1 | 8/2011 | Siddaramanna et al. |
| 2011/0212700 A1 | 9/2011 | Petite |
| 2011/0231320 A1 | 9/2011 | Irving |
| 2011/0258049 A1 | 10/2011 | Ramer et al. |
| 2011/0270454 A1 | 11/2011 | Kreiss et al. |
| 2011/0301774 A1 | 12/2011 | Koch |
| 2012/0066397 A1 | 3/2012 | Koch et al. |
| 2012/0066686 A1 | 3/2012 | Koch |
| 2012/0084696 A1 | 4/2012 | Marti |
| 2012/0093141 A1 | 4/2012 | Imes et al. |
| 2012/0101653 A1 | 4/2012 | Tran |
| 2012/0109399 A1 | 5/2012 | Tran |
| 2012/0136915 A1 | 5/2012 | Koch et al. |
| 2012/0173030 A1 | 7/2012 | Taft |
| 2012/0197456 A1 | 8/2012 | Walter et al. |
| 2012/0197457 A1 | 8/2012 | Walter et al. |
| 2012/0197458 A1 | 8/2012 | Walter et al. |
| 2012/0245968 A1 | 9/2012 | Beaulieu et al. |
| 2012/0271473 A1 | 10/2012 | Koch |
| 2012/0277920 A1 | 11/2012 | Koch |
| 2013/0035992 A1 | 2/2013 | Silverman |
| 2013/0047010 A1 | 2/2013 | Massey et al. |
| 2013/0079931 A1 | 3/2013 | Wanchoo et al. |
| 2013/0123996 A1 | 5/2013 | Matos |
| 2013/0144451 A1 | 6/2013 | Kumar et al. |
| 2013/0159052 A1* | 6/2013 | Seo .................. G06Q 10/06 705/7.31 |
| 2013/0173243 A1 | 7/2013 | Kayton et al. |
| 2013/0254151 A1 | 9/2013 | Mohagheghi et al. |
| 2014/0081704 A1 | 3/2014 | Strelec et al. |
| 2014/0122181 A1 | 5/2014 | Fisera et al. |
| 2014/0149973 A1 | 5/2014 | Walter et al. |
| 2014/0277769 A1 | 9/2014 | Matsuoka et al. |
| 2014/0277795 A1 | 9/2014 | Matsuoka et al. |
| 2014/0278687 A1 | 9/2014 | McConky et al. |
| 2015/0018985 A1 | 1/2015 | Koch et al. |
| 2015/0019032 A1 | 1/2015 | Koch et al. |
| 2015/0019037 A1 | 1/2015 | Koch |
| 2015/0019275 A1 | 1/2015 | Koch |
| 2015/0112500 A1 | 4/2015 | Koch |
| 2015/0134280 A1 | 5/2015 | Narayan et al. |
| 2015/0170171 A1 | 6/2015 | McCurnin et al. |
| 2015/0277400 A1 | 10/2015 | Koch |
| 2016/0055433 A1 | 2/2016 | Koch |
| 2016/0116513 A1 | 4/2016 | Dutta et al. |

FOREIGN PATENT DOCUMENTS

| | | | |
|---|---|---|---|
| JP | 2012118982 | 6/2012 | |
| KR | 10-2011-0099542 | * 9/2011 | ............. G06Q 50/00 |
| KR | 10-2011-0125541 | * 11/2011 | ............. G06Q 50/00 |
| WO | WO 2005/033964 | 4/2005 | |
| WO | WO 2008/027455 | 3/2008 | |
| WO | WO 2008/027457 | 3/2008 | |
| WO | WO 2009/006133 | 1/2009 | |
| WO | WO 2009/020606 | 2/2009 | |
| WO | WO 2009/023230 | 2/2009 | |
| WO | WO 2009/027617 | 3/2009 | |
| WO | WO 2009/085610 | 7/2009 | |
| WO | WO 2011/008775 | 1/2011 | |
| WO | WO 2011/065007 | 6/2011 | |
| WO | WO 2013/025565 | 2/2013 | |
| WO | WO 2013/055551 | 4/2013 | |
| WO | WO 2014/036408 | 3/2014 | |

OTHER PUBLICATIONS

"Smart Demand Response: A Discussion Paper," Energy Networks Association, energyuk, 44 pages, prior to Nov. 29, 2012.

Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.

Autogrid, "Austin Energy and AutoGrid Systems Collaborate on Standards-Based Automated Demand Response to Usher in a New Era of Retail Choice for the Demand Response Market," 5 pages, Feb. 26, 2013.

Combined Search and Examination Report Under Sections 17 and 18(3) for Corresponding UK Patent Application U.S. Appl. No. GB1504192.4 dated Sep. 8, 2015.

European Search Report for Related Application No. EP 12169650. 4, dated Nov. 22, 2012.

International Search Report for PCT Application Serial No. pct/us2012/058537, International Filing Date Oct. 3, 2012.

Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.

Couper, "Optimizing Demand Response to Improve Economic Dispatch and Reliability," downloaded from http://public.dhe.ibm.com/common/ssi/ecm/en/euw03026usen/EUW03026USEN.PDF, 5 pages, prior to Dec. 11, 2013.

Cruz, "Tutorial on GPU Computing with an Introduction to CUDA," 37 pages, prior to Nov. 17, 2011.

Federal Energy Regulatory Commission (FERC), "Assessment of Demand Response & Advanced Metering," 92 pages, Sep. 2007.

Holmberg, "Facility Interface to the Smart Grid," National Institute of Standards and Technology, 7 pages, printed 2012.

Honeywell, "Automated Demand Response—Southern California Program," 2 pages, printed Aug. 1, 2011.

Honeywell, "The Perfect Response to Peak Events," 4 pages, Nov. 2010.

http://en.wikipedia.org/wiki/Demand_response, "Demand Response," 10 pages, printed Feb. 3, 2012.

http://www.akuacom.com/solutions/index.html, "Akuacom—Automated Demand Response," 2 pages, printed Feb. 3, 2012.

http://www.naesb.org/pdf3/dsmee012308213.doc, "Demand Response Measurement and Verification Literature Review," 29 pages, created Jan. 14, 2008, modified Dec. 18, 2012.

https://buildingsolutions.honeywell.com/Cultures/en-US/Markets/Utilities/DemandResponse/, 1 page, printed Feb. 3, 2012.

Hunt, "Automated Demand Response System and Advanced End-Use Services Platform," Optimal Technologies, 31, pages, Sep. 24, 2004.

Kiliccote et al., "Findings from Seven Years of Field Performance Data for Automated Demand Response in Commercial Buildings," Lawrence Berkeley National Laboratory, Report No. LBNL-3643E, May 2010.

(56) References Cited

OTHER PUBLICATIONS

Kiliccote et al., "Open Automated Demand Response Communications in Demand Response for Wholesale Ancillary Services," Lawrence Berkeley National Laboratory, Report No. LBNL-2945E, 13 pages, Nov. 2009.

Kiliccote et al., "Open Automated Demand Response for Small Commercial Buildings," Lawrence Berkeley National Laboratory, Report No. LBNL-2195E, 104 pages, Jul. 2009.

Koch et al., "Architecture Concepts and Technical Issues for an Open, Interoperable Automated Demand Response Infrastructure," Berkeley National Laboratory, Report No. LBNL-63664, 7 pages, Oct. 2007.

Koch et al., "Direct Versus Facility Centric Load Control for Automated Demand Response," Lawrence Berkeley National Laboratory, Report No. LBNL-2905E, 11 pages, Nov. 2009.

Koch et al., "Scenarios for Consuming Standardized Automated Demand Response Signals," Lawrence Berkeley National Laboratory, Report No. LBNL-1362E, 10 pages, Nov. 2008.

Koch, "The Demand Response Automation Server (DRAS)," Building Performance, http://www.akuacom.com/assets/pdf/ASHRAE_2008_Ed_Koch.pdf, 18 pages, prior to Nov. 17, 2011.

Olson, "New Approaches in Automating and Optimizing Demand Response to Solve Peak Load Management Problems," Building IQ brochure, 8 pages, 2011.

Piette et al., "Automated Critical Peak Pricing Field Tests: 2006 Pilot Program Description and Results," Berkeley National Laboratory, Report No. LBNL-62218, 67 pages, Aug. 2007.

Piette et al., "Automated Critical Peak Pricing Field Tests: Program Description and Results," Lawrence Berkeley National Laboratory, Report No. LBNL-59351, Apr. 2006.

Piette et al., "Design and Implementation of an Open, Interoperable Automated Demand Response Infrastructure," Berkeley National Laboratory, Report No. LBNL-63665, 6 pages, Oct. 2007.

Piette et al., "Findings From the 2004 Fully Automated Demand Response Tests in Large Facilities," Lawrence Berkeley National Laboratory, Report No. LBNL-58178, 197 pages, Sep. 2005.

Piette et al., "Linking Continuous Energy Management and Open Automated Demand Response," Lawrence Berkeley National Laboratory, Report No. LBNL-1361E, 9 pages, Nov. 2008.

Piette et al., "Open Automated Demand Response Communications Specification," Version 1.0, CEC-500-2009-063, 214 pages, Apr. 2009.

Piette et al., "Participation through Automation: Fully Automated Critical Peak Pricing in Commercial Buildings," Berkeley National Laboratory, Report No. LBNL-60614, 14 pages, Aug. 13-18, 2006.

Santacana et al., "Getting Smart, With a Clearer Vision of Intelligent Grid, Control Emerges from Chaos," IEEE Power and Energy Magazine, pp. 41-48, Mar./Apr. 2010.

Schisler et al., "The Role of Demand Response in Ancillary Services Markets," IEEE, 3 pages, 2008.

Violette et al., "DRR Valuation and Market Analysis vol. II: Assessing the DRR Benefits and Costs," Summit Blue Consulting, 112 pages, Jan. 6, 2006.

Watson et al., "Machine to Machine (M2M) Technology in Demand Responsive Commercial Buildings," Berkeley National Laboratory, Report No. LBNL-55087, 18 pages, Aug. 2004.

Yin et al., "Auto-DR and Pre-Cooling of Buildings at Tri-City Corporate Center," Lawrence Berkeley National Laboratory, Report No. LBNL-3348, 140 pages, Nov. 2008.

Zaidi et al., "Load Recognition for Automated Demand Response in Microgrids," IEEE, pp. 2436-2439, 2010.

Akuacom by Honeywell, "Automated Demand Response," 2 pages, Sep. 2012.

https://drrc.lbl.gov/openadr, "OpenADR," Berkeley Labs Demand Response Research Center, 2 pages, printed Apr. 6, 2017.

Siemens, "Demand Response Management System (DRMS), Version 2.5," 3 pages, Oct. 2014.

* cited by examiner

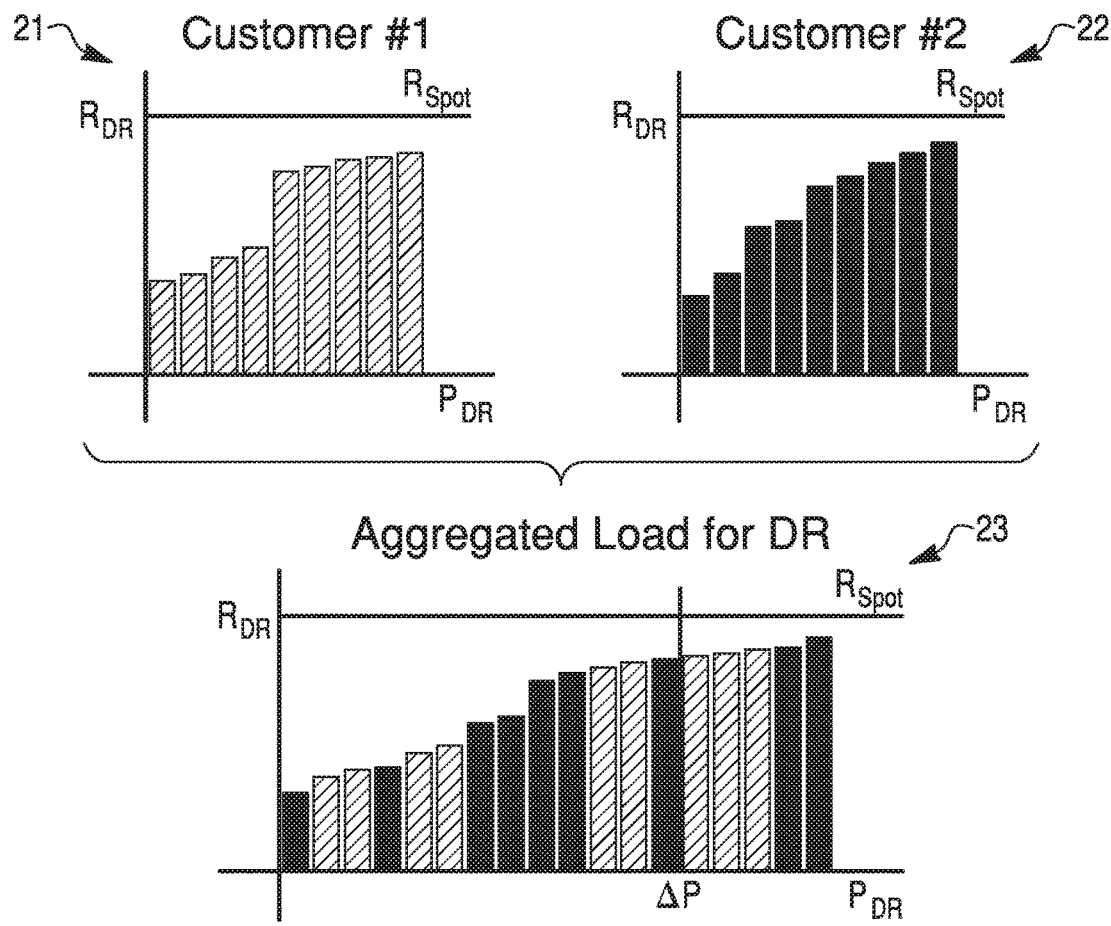
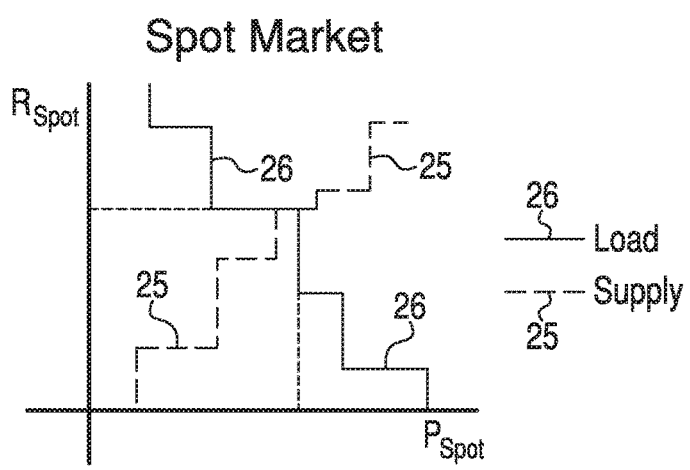

FIG. 7

LOAD > SUPPLY

Optimization of ΔP Elimination

Balance Equation $\quad \underbrace{\Delta P = P_{Load} - P_{Purchased} \quad \Delta P - P_{DR} - P_{SPOT} - P_{AS}}_{\Delta P_{CORR}} = 0$ Profit Equation $\quad R = R_{Load} - R_{DR} - R_{SPOT} - R_{AS} - R_{Purcahsed}$

FIG. 8

LOAD < SUPPLY

Optimization of ΔP Elimination

Balance Equation $\quad \underbrace{\Delta P = P_{Load} - P_{Purchased} \quad \Delta P + P_{DR} + P_{SPOT} + P_{AS}}_{\Delta P_{CORR}} = 0$ Profit Equation $\quad R = R_{Load} - R_{DR} + R_{SPOT} - R_{AS} - R_{Purcahsed}$

FIG. 10

LOAD > SUPPLY

Balance Equation $$\Delta P - \underbrace{P_{DR} - P_{SPOT} - P_{AS}}_{\Delta P_{CORR}} = 0 \qquad \Delta P = P_{Load} - P_{Purchased}$$

Profit Equation $$R(\Delta P) = R_{Load}(P) - R_{DR}(\alpha \cdot \Delta P) + R_{SPOT}(\beta \cdot \Delta P) - R_{AS}(\chi \cdot \Delta P) - R_{Purchased}$$

DECISION SUPPORT SYSTEM BASED ON ENERGY MARKETS

This present application is a Continuation of U.S. patent application Ser. No. 13/621,195, filed Sep. 15, 2012. U.S. patent application Ser. No. 13/621,195, filed Sep. 15, 2012, is hereby incorporated by reference.

BACKGROUND

The present disclosure pertains to power and particularly to stabilization of power grids. More particularly, the disclosure pertains to buying and selling power.

SUMMARY

The disclosure reveals a system for purchasing and selling power that fairly accommodates sellers and buyers. For instance, a submarket may be formed between a utility company or retailer and its consumer or customer. The utility or retailer may eliminate differences between generated or purchased power based on day-ahead predictions and demanded power in a given day. Mechanisms used for elimination of power differences may incorporate purchasing or selling power on the spot market, and affecting a demand for power with demand response programs. A difference between purchased power and demanded power may be minimized by forming an optimal power stack having a mix of power of the demand response program, power at the spot market and/or power of ancillary services. A transmission and system operator (TSO) may operate a distribution grid and maintain grid stability through a use of ancillary services. The utility may pay a fee for elimination of its eventual power imbalance to the TSO. An optimization sequence may be implemented to minimize the difference between the purchased power and demanded power, and to maximize profit.

BRIEF DESCRIPTION OF THE DRAWING

FIG. 4 is a diagram of graphs relevant to consumers' load reduction relative to a demand response program;

FIG. 5 is a diagram of plots of spot market price versus power and for supply and load;

FIG. 7 is a diagram of a set of equations concerning elimination of a difference in power balance equation for a load greater than supply;

FIG. 8 is a diagram of a set of equations concerning elimination of a difference in power balance equation for a load less than supply;

FIG. 10 is a diagram of balance and profit equations for a load greater than supply;

DESCRIPTION

Figure 1:
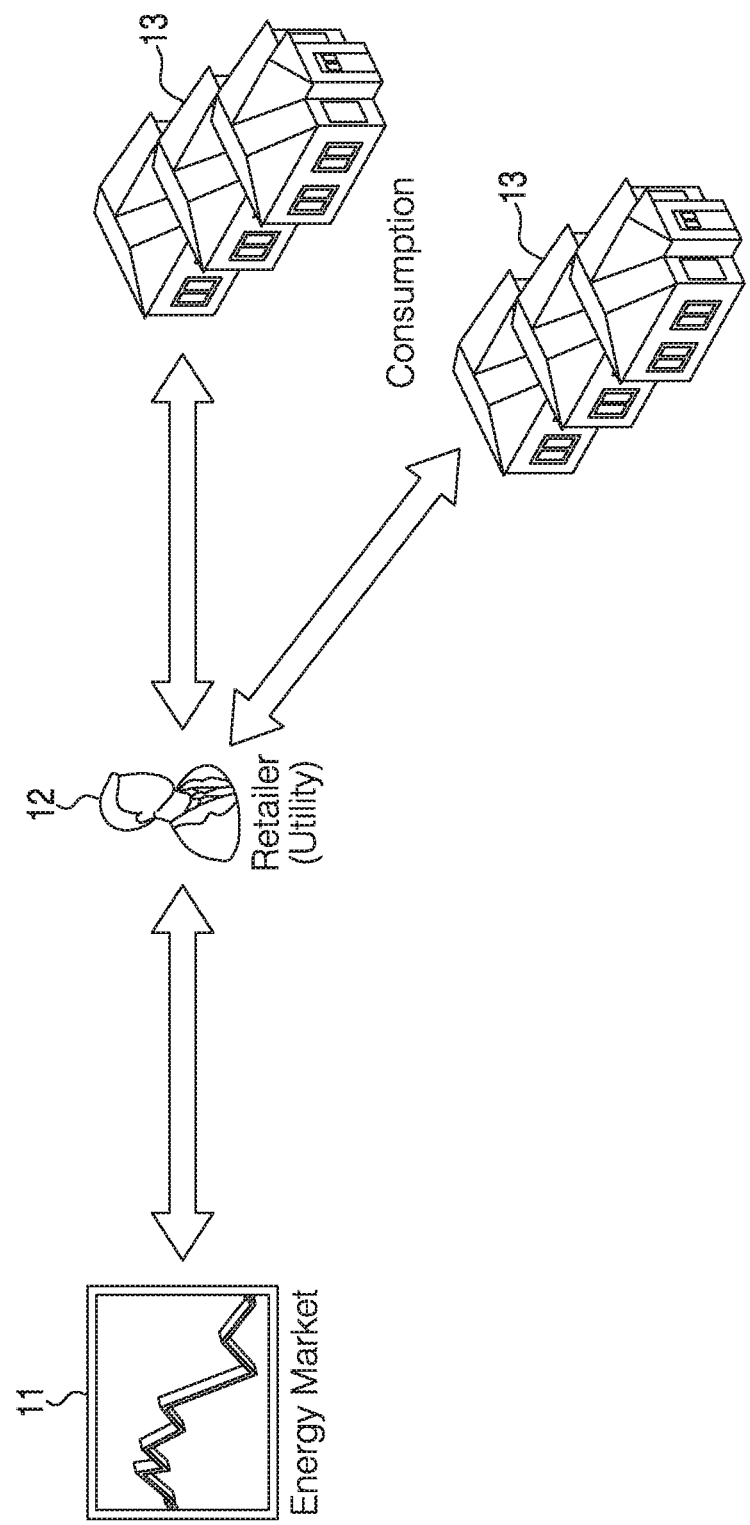
FIG. 1 is a diagram illustrative of the components and dynamics among an energy market, a retailer and consumers.

A utility company may be responsible for stabilization of the power grid and for this purpose can use several stabilization mechanisms. The utility company or companies may have made an effort to reduce usage of the ancillary services because of their high prices. A demand response (DR) program may be another option to ensure a stability of the grid by influencing the demand. With an application of the program, the utility company may change customers' loads if a change is beneficial. Utility companies may offer various demand response programs to their customers and each customer can participate in a DR program in its own way. DR programs may be divided into programs with discrete decisions and real-time pricing.

However, DR programs may have considerable drawbacks for both sides—consumers and utility companies. First, the utility company may face a rather difficult decision. In a case of programs with discrete decisions, a DR adjustment is not necessarily smooth and may represent a complex combinatory issue. In case of real-time pricing, it may be difficult to determine an appropriate price as well as the reactions of the consumers that are of a stochastic nature. "Stochastic" may be of or pertain to a process involving a randomly determined sequence of observations each of which is considered as a sample of one element from a probability distribution.

On the other hand, the consumers may have to consider their reactions to a DR event with respect to changing prices (in the case of real-time pricing). Alternatively, the customers may face more or less discrete decisions.

Demand bidding programs may just exploit fixed incentives (e.g., 0.50 cents/kW in day-ahead mode and 0.60 cents/kW in day-of mode). The participants may then just decide whether they should submit their bids and determine what amount of power they are willing to curtail. Bids may be gathered by a utility or at a demand response automation server (DRAS) and evaluated when the time for bid-sending is over. Such an approach may have some disadvantages. First, the fixed discount rate may not necessarily be always beneficial because of its inherent inability to react on current conditions (e.g., real time price, actual demand, and so on). It is simply not necessarily a result of continuous trading but may be rather of an apparent long-term over-designed estimate. Second, the programs may count just with the demand reduction on the participants' side. However, when a utility is facing a power surplus, it may be beneficial for the utility to provide an incentive payment to a customer who commits to move some power required operation (i.e., a re-schedulable load) to a time interval with a surplus.

The present approach may provide a business model for utilities and their consumers that copes with above-mentioned issues, and also be a related decision support tool for utilities for bringing in significant savings.

One goal may be to create a virtual submarket between a utility company (retailer) and its customer. A customer may actively participate in a DR program and supply bids for a load increase or reduction to the virtual submarket (located on utility side).

Customers may evaluate and submit bids that consist of an energy amount and a corresponding price. A price may depend on the particular case and can be categorized as revenue in the case of load reduction, or as a discount price for an additional load in the case of a load increase.

A utility company may need to eliminate differences between generated (purchased) and demanded power. Three kinds of mechanisms may be utilized for elimination of a power difference. The mechanisms may 1) use ancillary services, 2) purchase or sell power at the spot market, or 3) influence the demand via DR program events, respectively. Each mechanism may have its advantages and disadvantages.

1) Ancillary services may represent an ample power source with deterministic prices, but these prices can be high. 2) On the spot market, the power may be sold or bought under market prices which are of a stochastic nature and unknown until trading time. 3) In the present DR mechanism, prices for DR may be given by customers and the prices may be nondeterministic, but known. The utility may have full control of acceptance of the customer's bids (DR power). The first two mechanisms may affect the supply side and the last mechanism (DR) may affect the demand side. The utility may make a decision about an optimal structure of a power stack used for elimination of a power difference. The power may be considered as a mix of DR power, power bought on spot market, and ancillary services power.

A present decision support system may be provided in a form of, e.g., a web service residing on a cloud, on an automated demand response server and help to find an optimal ratio of power mixing. The system may use a scenario approach for overcoming the uncertainty that is included in customer's loads and in final spot market prices. Advanced optimization algorithms (i.e., mixed integer stochastic optimization) may be employed for optimal power mixing and optimal customer bids selection. Probabilistic measures may be exploited for an evaluation of risk. A level of risk may be specified by the utility (e.g., conservative behavior versus aggressive behavior).

There may be basically two major features of the present approach. 1) The customers may have the opportunity to influence the final incentives (which are fixed in a current demand bidding program (DBP)) as they are allowed to send the bids that consist not only of a power reduction/increase amount but also an expected price for each particular amount. Furthermore, not only may load reduction bids be requested but also bids may be made for load increases. The utility may then decide whether it is economically beneficial to exploit these bids or, e.g., sell the power surplus back to the market. 2) A present decision support tool may help the utility to make the most beneficial decisions in every step of an operation. For example, the tool may suggest an optimum amount of power to be taken from accepted bids (besides the decision about which bids should be accepted), an optimum amount of power that should be traded at the market, and so forth (e.g., from ancillary services). The decisions may be generated by the optimization tool that considers the stochastic nature of involved variables by using a so-called scenario approach (i.e., a significant principle from stochastic optimization).

There may be devices placed on the customer site that can communicate with a DR server. Each customer may be allowed to submit bids that consist of a provided amount of demand reduction/increase, time interval and price offer. The bid may also have a form of a function (price=function (power increase or reduction)). Bids may be generated either manually or automatically whenever they are requested by the DRAS (demand response automation server) hosting the virtual sub-market application. Similarly with respect to demand bidding programs, which may already be run by most of the utilities supporting a demand response, the bids may be requested the day before a particular event (i.e., day-ahead mode) or directly during the event day (i.e., day-of mode, near future or real time DR).

When an electricity demand forecaster, running at the DRAS, indicates that, on the next day (a day-ahead mode), there may be a high probability of a mismatch between purchased/generated power and a forecasted demand, the request for bids may be sent to virtually all DR participants. The participants may be requested to send their bids up to some fixed deadline on the day before event. The participants of the particular DR program may then submit their bids. The utility may evaluate the most profitable composition of a power stack needed for overcoming the purchased/generated power versus demand discrepancy. Nearly, the same mechanism may be utilized for the day-of events. The events may be generated when more accurate (forecast horizon in order of hours) predictions are available. The participants may then have, of course, less time to submit their bids; however, they can expect higher payments as the final price should be more influenced by the spot market and the ancillary services price. In both modes (the day-ahead and day-of), the virtual sub-market application running at DRAS may be responsible for generating recommendations for a utility in how to compound the power from different sources (e.g., the market, ancillary services, DR bids, and so on) in the final corrective action that matches the demand and supply with each other.

A decision support system may be based on a virtual energy market (VEM). Accomplishments may incorporate establishing a new mechanism for demand responses, creating a virtual submarket between a retailer (utility) and its customers, and bringing benefits to the retailer (i.e., higher profit) and to consumers (i.e., more savings).

FIG. 1 may be a basic diagram illustrative of the components and dynamics between an energy market 11, a retailer 12 (e.g., utility), and consumption 13 (e.g., customers). A two-way relationship may exist between market 11 and retailer 12. A two-way relationship may also exist between consumption 13 and retailer 12. For instance, bids of consumption may be either accepted or denied.

Figure 2:
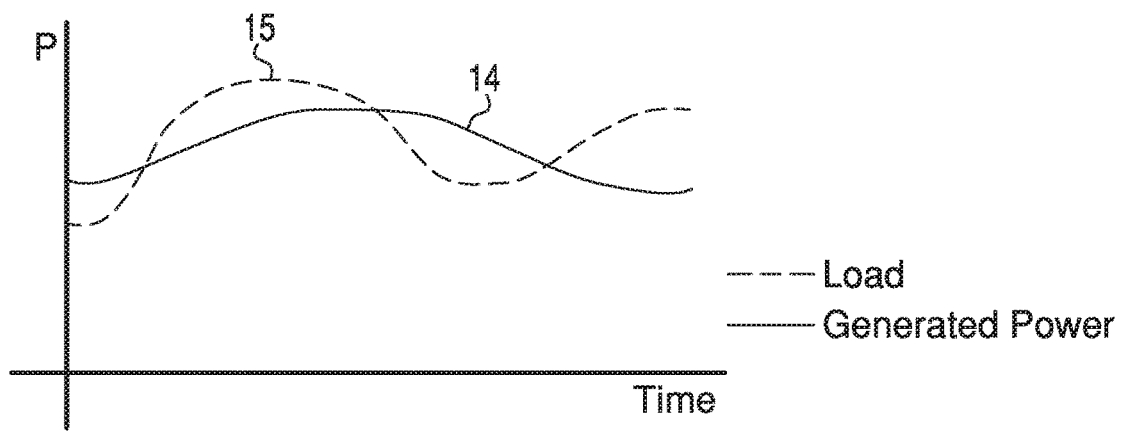
FIG. 2 is a diagram of a graph of generated power and load versus time.
Figure 3:
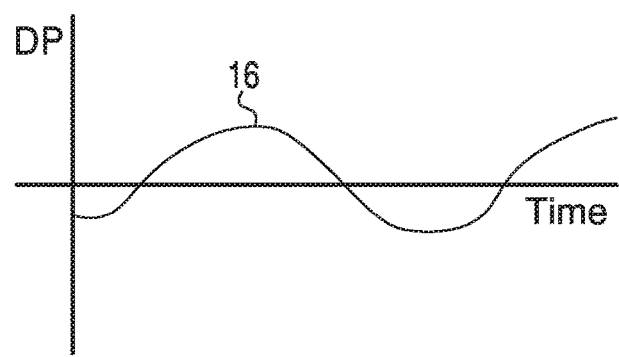
FIG. 3 is a diagram of a graph of a power difference between generated power and load versus time.

FIG. 2 is a diagram of a graph of power versus time. In an example, curve 14 may represent generated power and curve 15 may represent a load. Load may be understood as power utilized by a consumer (e.g., customer). FIG. 3 is a diagram of a graph of power difference and time. Curve 16 may represent a power difference between the generated/purchased power and the load. Customers may participate actively in a DR program, supply bids for load increases or reductions, and send these bids to the retailer (utility, ADR Server). These bids may be used to reduce the power difference.

FIG. 4 is a diagram of graphs relevant to customers' overall load reduction (DR). Graph 21 for a customer #1 may be $R_{DR}$ (revenue—demand response) versus $P_{DR}$ (power—demand response) where there is a bar for $R_{DR}$ at each $P_{DR}$ increment. An $R_{Spot}$ (revenue—spot market) is shown in graph 21. Graph 22 for customer #2 may be $R_{DR}$ versus $P_{DR}$ where there is a bar for $R_{DR}$ at each $P_{DR}$ increment. An $R_{Spot}$ is shown in graph 22. Graph 23 may be $R_{DR}$ versus $P_{DR}$ where the information of customers #1 and #2 are combined to reveal an aggregated load for DR. There is a bar of customer #1 or #2 for $R_{DR}$ at each $P_{DR}$ increment, as indicated by a shading of the bar. A $\Delta P$ (e.g., a difference between generated power and demand power) is indicated in graph 23. An $R_{Spot}$ level is also shown in graph 23.

FIG. 5 is a diagram of a graph of the spot market. The graph may be plots of $R_{Spot}$ (price for power unit on the spot market) versus $P_{Spot}$ (power—spot market) for supply as shown by plot 25 and for load as shown by plot 26.

Figure 6:
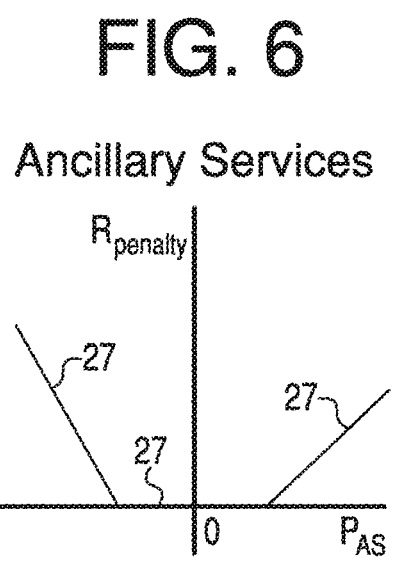
FIG. 6 is a diagram of a plot of ancillary service penalty versus power.

FIG. 6 is a diagram of a graph of ancillary services. The graph may be plot $R_{Penalty}$ (revenue—penalty) versus $P_{AS}$ (power—ancillary services) as indicated by lines 27.

Particular bids may consist of an amount of energy, duration time and incentives. The incentives may depend of the particular case which may provide revenue in the event of load reduction and a discount of price for additional loads in the event of a load increase.

A retailer (utility) may eliminate differences between purchased and load power or energy. The difference may be eliminated via DR, spot market or ancillary power. The retailer may make a decision about accepting bids from customers.

A retailer may purchase an energy or power profile for the next day in the day-a-head market. The purchase may depend on a load forecast for the next day. Generally, power differences may occur because of load uncertainties. A retailer may want to eliminate the differences in an economically optimal way.

Difference elimination possibilities may incorporate: 1) Letting a system operator making use of ancillary services to eliminate the difference (i.e., an expensive way); 2) Selling or purchasing, for instance, electricity on the market (i.e., price is given by market—stochastic approach); and 3) Making a demand response action (i.e., price is given by relationship of a trader-consumer—deterministic approach).

One may note an optimization at a one time instance of a $\Delta P$ elimination with a set 31 of equations indicated in FIG. 7 for a load greater than supply. A balance equation may be indicating $\Delta P = P_{load} - P_{Purchased}$. "$-P_{DR} - P_{Spot} - P_{AS}$" may indicate specifics of a $\Delta P$ correction, as "$\Delta P - P_{DR} - P_{Spot} - P_{AS} = 0$". A profit equation may be $R = R_{Load} - R_{DR} - R_{Spot} - R_{AS} - R_{Purchased}$. $R_{Load}$ may indicate that paid by customers, a deterministic variable (given by contracts) and reflect an actual load. $R_{DR}$ may indicate a price given by a DR mechanism, a stochastic variable and a decision about a price made on the side of a retailer. $R_{SPOT}$ may indicate unit costs given by a spot market, a stochastic variable and involve a risk of increased costs. $R_{AS}$ may indicate a price given by a central authority, a deterministic variable and having a risk of a possible penalty. $R_{Purchased}$ may indicate costs for power already bought.

One may note an optimization of a $\Delta P$ elimination with a set 32 of equations indicated in FIG. 8 for a load less than supply. A balance equation may be indicated by $\Delta P = P_{load} - P_{Purchased}$. "$+P_{DR} + P_{Spot} + P_{AS}$" may indicate specifically of a $\Delta P$ correction, as "$\Delta P + P_{DR} + P_{Spot} + P_{AS} = 0$". A profit equation may be $R = R_{Load} - R_{DR} + R_{Spot} - R_{AS} - R_{Purchased}$. $R_{Load}$ may indicate that paid by customers, a deterministic variable (given by contracts) and reflect an actual load. $R_{DR}$ may indicate a price given by a DR mechanism, a stochastic variable and a decision about a price made on the side of a retailer. $R_{SPOT}$ may indicate a price given by a spot market, a stochastic variable and involve a chance of a lower price or bids that could not be accepted. $R_{AS}$ may indicate a price given by a central authority, a deterministic variable and having a risk of a possible penalty. $R_{Purchased}$ may indicate costs for power already bought.

Figure 9:
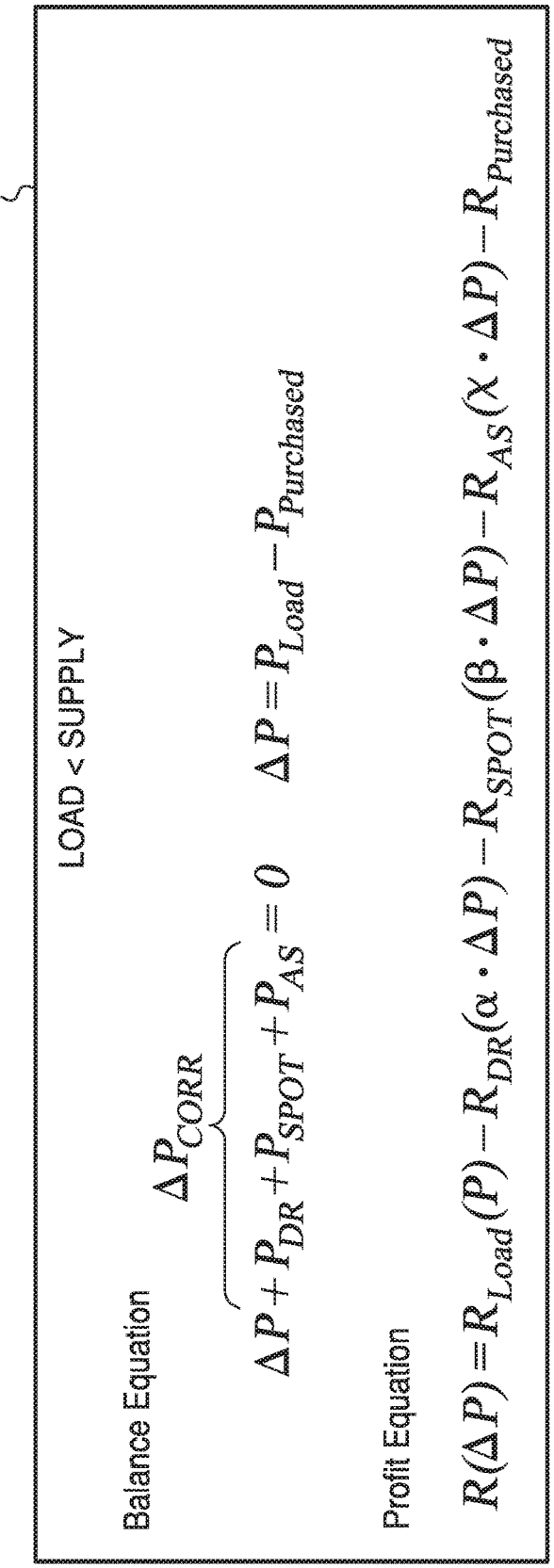
FIG. 9 is a diagram of balance and profit equations for a load less than supply.

FIGS. 9 and 10 reveal balance and cost equations. For load less than supply in FIG. 9, a set 33 of equations, as noted herein, may incorporate a balance equation of $\Delta P = P_{load} - P_{Purchased}$, where $\Delta P + P_{DR} + P_{Spot} + P_{AS} = 0$. "$+P_{DR} + P_{Spot} + P_{AS}$" may indicate specifics of a $\Delta P$ correction. Also in set 33 may be a profit equation of $R(\Delta P) = R_{Load}(P) - R_{DR}(\alpha \cdot \Delta P) - R_{Spot}(\beta \cdot \Delta P) - R_{AS}(\chi \cdot \Delta P) - R_{Purchased}$.

$R_{Load}(P)$ may indicate a deterministic price (known) and load reflection. $R_{DR}(\alpha \cdot \Delta P)$ may indicate a stochastic price (known) and limited power. $R_{Spot}(\beta \cdot \Delta P)$ may indicate a stochastic price (unknown) and partially limited power. $R_{AS}(\chi \cdot \Delta P)$ may indicate a deterministic price (penalty) and "unlimited" power. $R_{Purchased}$ may indicate purchased power and is not necessarily important for optimization.

For a load greater than supply, a set 34 of equations, as shown in FIG. 10, may incorporate a balance equation of $\Delta P = P_{load} - P_{Purchased}$, where $\Delta P + P_{DR} + P_{Spot} + P_{AS} = 0$ "$+P_{DR} + P_{Spot} + P_{AS}$" may indicate specifics of a $\Delta P$ correction. Also in set 34, may be a profit equation of $R(\Delta P) = R_{Load}(P) - R_{DR}(\alpha \cdot \Delta P) + R_{Spot}(\beta \cdot \Delta P) - R_{AS}(\chi \cdot \Delta P) - R_{Purchased}$.

$R_{Load}(P)$ may indicate a deterministic price (known) and load reflection. $R_{DR}(\alpha \cdot \Delta P)$ may indicate a stochastic price (known) and limited power. $R_{Spot}(\beta \cdot \Delta P)$ may indicate a stochastic price (unknown) and partially limited power. $R_{AS}(\chi \cdot \Delta P)$ may indicate a deterministic price (penalty) and "unlimited" power. $R_{Purchased}$ may indicate purchased power and is not necessarily important for optimization.

Figure 11:
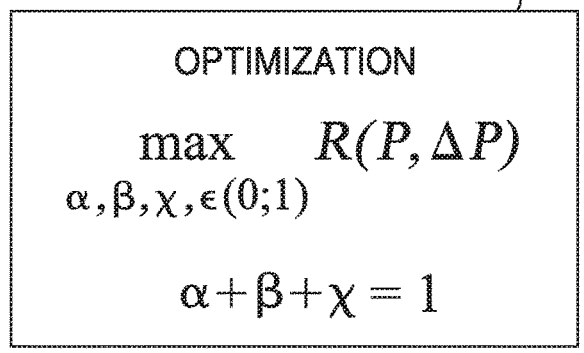
In FIG. 11, is a diagram of symbols representing optimization of a power differential and profit.

In FIG. 11, symbols 35 representing optimization may incorporate $$\max_{\alpha, \beta, \chi \in \langle 0;1 \rangle} R(P, \Delta P)$$

where $\alpha + \beta + \chi = 1$. A scenario approach may be used to overcome an uncertainty. Solving the optimization task may be done with a presently selected approach. Probabilistic measures may lead to a determination of risk.

An optimization sequence may incorporate: 1) Reading historical data from a database; 2) Constructing one or more load forecasting models; 3) Retrieving external information about prices and weather trends; 4) Retrieving bids from consumers; 5) Using the models, generating scenarios and considered parameter combinations ($\alpha$, $\beta$, $\chi$) (e.g., 0.6, 0.3, 0.1); 6) For each parameter combination ($\alpha$, $\beta$, $\chi$), a) evaluating a cost function for particular settings ($\alpha$, $\beta$, $\chi$) over virtually all scenarios, and b) using probabilistic measures, e.g., a combination the brings a highest revenue at a given risk level (such as revenue achieved with 95 percent probability), as an aggregation function for virtually all scenarios in determination of a final value of the cost function for the combination ($\alpha$, $\beta$, $\chi$); 7) Finding optimal values of parameters $\alpha^*$, $\beta^*$, $\chi^*$ from aggregated values; 8) Informing consumers about acceptance; and 9) Measuring a real operation and saving the operation to a database.

As to step 2, concerning model construction, models may be needed for: a) Distributions P(Weather), P(Prices), P(Behavior|Weather); b) Mapping Consumption(Weather, Behavior, Acceptance); and c) Mapping Profit (Consumption, Acceptance, Prices). One may note profit as revenue and cost but as also involving accepted and fulfilled incentives.

The models may be obtained or construed from historical data (i.e., a black box), possibly with use of: a) Some apparent relationships such as summing up the total consumption of particular consumers; b) External information such as weather forecasts, public holidays, and so forth; and c) Behavior to be modeled as a function of time explaining modeling residuals of black box models of the consumption conditioned by weather and acceptance.

As to step 5, concerning application of a scenario approach, a scenario may represent uncertain information in the system. Knowing the scenario and making a decision, a next evolution of the system may be determined. In a case of DR programs, scenarios may involve: a) Weather (temperature, humidity, solar radiation) which may not necessarily depend on decisions; b) Consumer behavior patterns (daily, weekly, yearly trends) which may be affected by acceptance of demand response bids; c) Spot market (prices); and d) Impact of DR (e.g., in the hope that the consumer is able to fulfill the bid).

As to step 5, concerning generating scenarios, items to be noted may incorporate: 1) Sampling a trajectory of weather, prices; 2) Conditioned in this trajectory, sampling a trajectory of behavior; and 3) Determining consumption as a function of acceptance. The steps may be repeated in that many scenarios are generated. Thus, each scenario "s" may produce mapping—Consumption$_s$(Acceptance). Consumption and prices may directly determine utility profit—Profit$_s$(Acceptance).

As to step 6, an aim of optimization may be to maximize profit with ensuring an elimination of a power difference—$\Delta P + \Delta P_{CORR} = 0$ and $\Delta P_{CORR} = (\alpha \cdot \Delta P) + (\beta \cdot \Delta P) + (\chi \cdot \Delta P)$, where $(\alpha \cdot \Delta P)$ pertains to $R_{DR}$, $(\beta \cdot \Delta P)$ pertains to $R_{SPOT}$, and $(\chi \cdot \Delta P)$ pertains to $R_{AS}$. An optimization algorithm may find an optimal combination of a spot market power $\beta$ and an ancillary services power $\chi$. A demand response power $\alpha$ may be a discrete variable determined by acceptance. An impact of individual consumers may be assumed to be reasonably independent. With respect to a search algorithm, genetic algorithms may be proposed because of a discontinuous objective function. Other heuristics may be applicable if a set of accepted bids does not depend on a simple sort.

Figure 12:
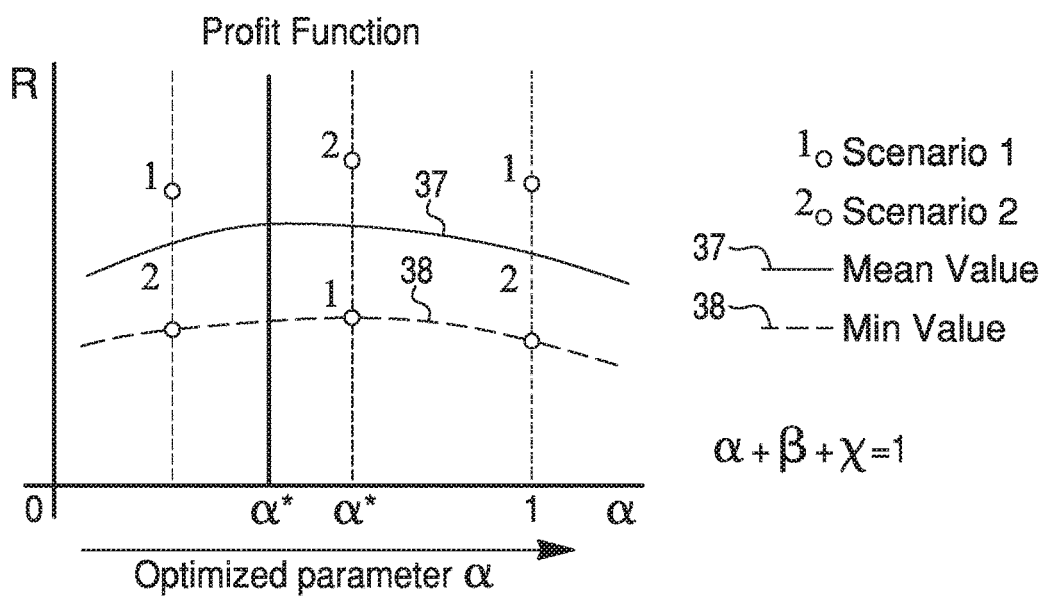
FIG. 12 is a diagram of a graph involving an aggregation of cost function values in selected scenarios with fixed parameters.
Figure 13:
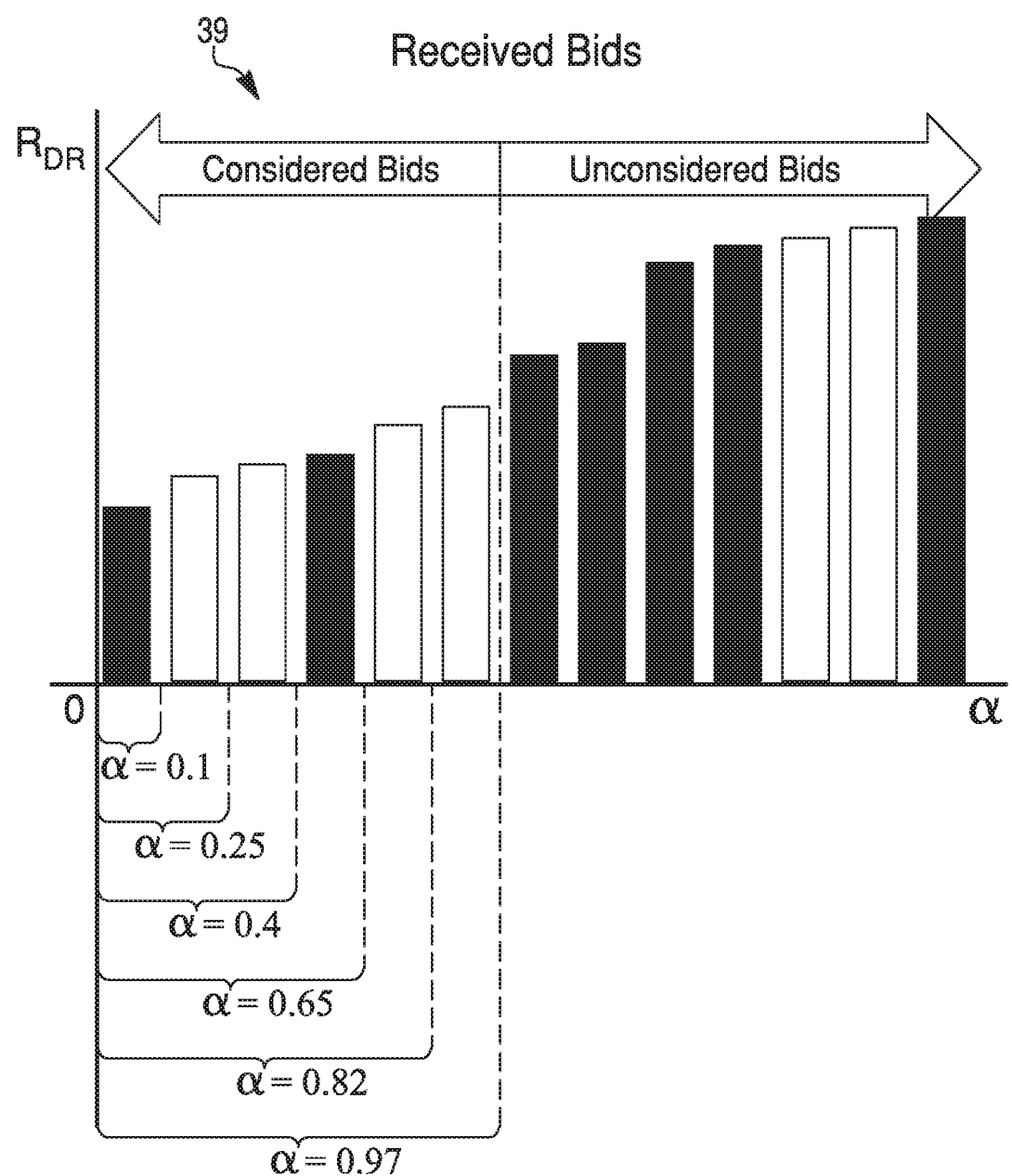
FIG. 13 is a diagram of a graph showing considered bids for various values of a demand response power parameter.

FIGS. 12 and 13 reveal an optimization example, relative to step 6. FIG. 12 is a diagram of a graph involving an aggregation of cost function values in two selected scenarios with parameters $\beta, \chi$. The graph shows a profit function with R versus an optimized parameter $\alpha$. $1_o$ represents scenario 1. $2_o$ represents scenario 2. Line 37 indicates a mean value and line 38 indicates a minimum value. It may be noted that $\alpha+\beta+\chi=1$, $\alpha=\{0.1, 0.25, 0.4, 0.65, 0.82, 0.97\}$, and $\beta,\chi \in <0; 1>$.

FIG. 13 is a diagram of a graph 39 showing received unit price bids with an amount versus $\alpha$ for considered bids. Unconsidered bids are also noted. The light and dark bars may represent customers #1 and #2, respectively.

As to step 6, concerning risk measures, the following factors may be considered. Using a selected measure may determine an aggregation function. Parameter $\alpha$ may represent an optimal combination of supplied bids (discretized value). A selected combination may optimize an objective function (e.g., profit) over virtually all scenarios with a consideration of risk. Possible aggregation approaches may incorporate: 1) Mean—a combination may maximize expected profit over virtually all scenarios; 2) Worst case—a combination may maximize a minimal profit over virtually all scenarios; and 3) Percentile—a combination may maximize a profit that is given by N-th percentile of the objective functions for virtually all scenarios.

Figure 14:
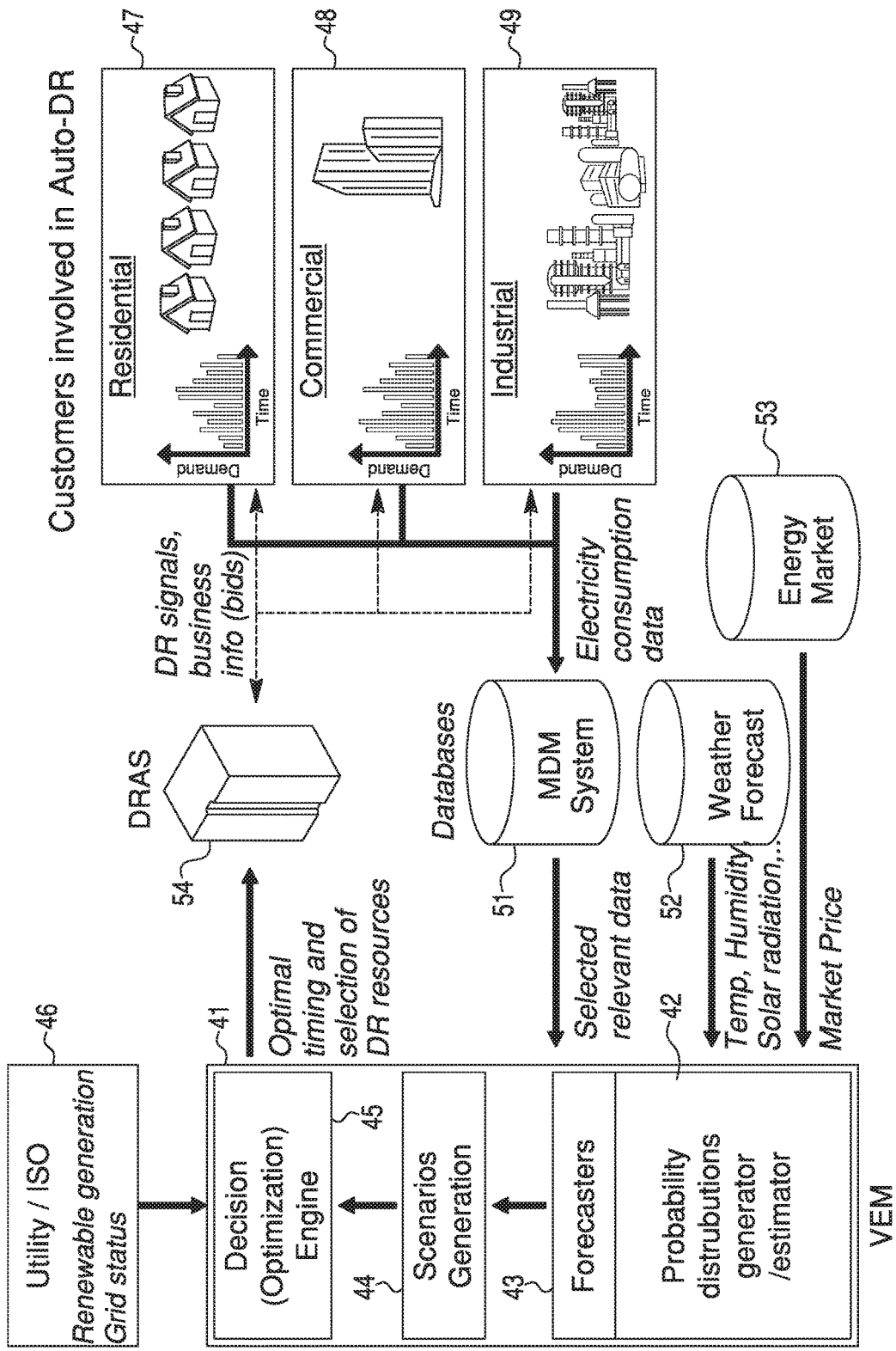
FIG. 14 is a diagram of a deployment scheme of the present system relative to a virtual energy market.

FIG. 14 is a diagram of a deployment scheme of the present system relative to a virtual energy market (VEM). A VEM 41 incorporating a probability distribution generator/estimator 42, a forecaster module 43, a scenario generation module 44 and a decision (optimization) engine 45. The probability distribution generator/estimator 42, forecaster module 43, scenario generation module 44 and decision (optimization) engine 45 may be interconnected to one another. A utility/system operator (SO) 46 may provide information such as renewable generation and grid status to engine 45. Customers involved in auto-DR may incorporate one or more residential customers 47, commercial customers 48 and industrial customers 49. Customers 47, 48 and 49 may provide electricity consumption data to a database such as a meter data management (MDM) system database 51. Database 51 may provide selected relevant data to VEM 41. A weather forecast database 52 may provide temperature, humidity, solar radiation and related information to VEM 41. An energy market database 53 may provide market prices and related information to VEM 41. There may also be ancillary services and related information available for VEM 41. Other databases may provide pertinent information to VEM 41. Decision engine 45 may take information from, for instance, scenario generator module 44, forecaster module 43, generator/estimator 42, utility/ISO 46, and databases 51-53, to provide an output such as optimal timing and selection of DR resources. The output from engine 45 may go to DRAS 54 for processing. DRAS 54 may provide DR signals and business information to customers 47-49. Customers 47-49 may provide business information (e.g., bids) to DRAS 54.

Figure 15:
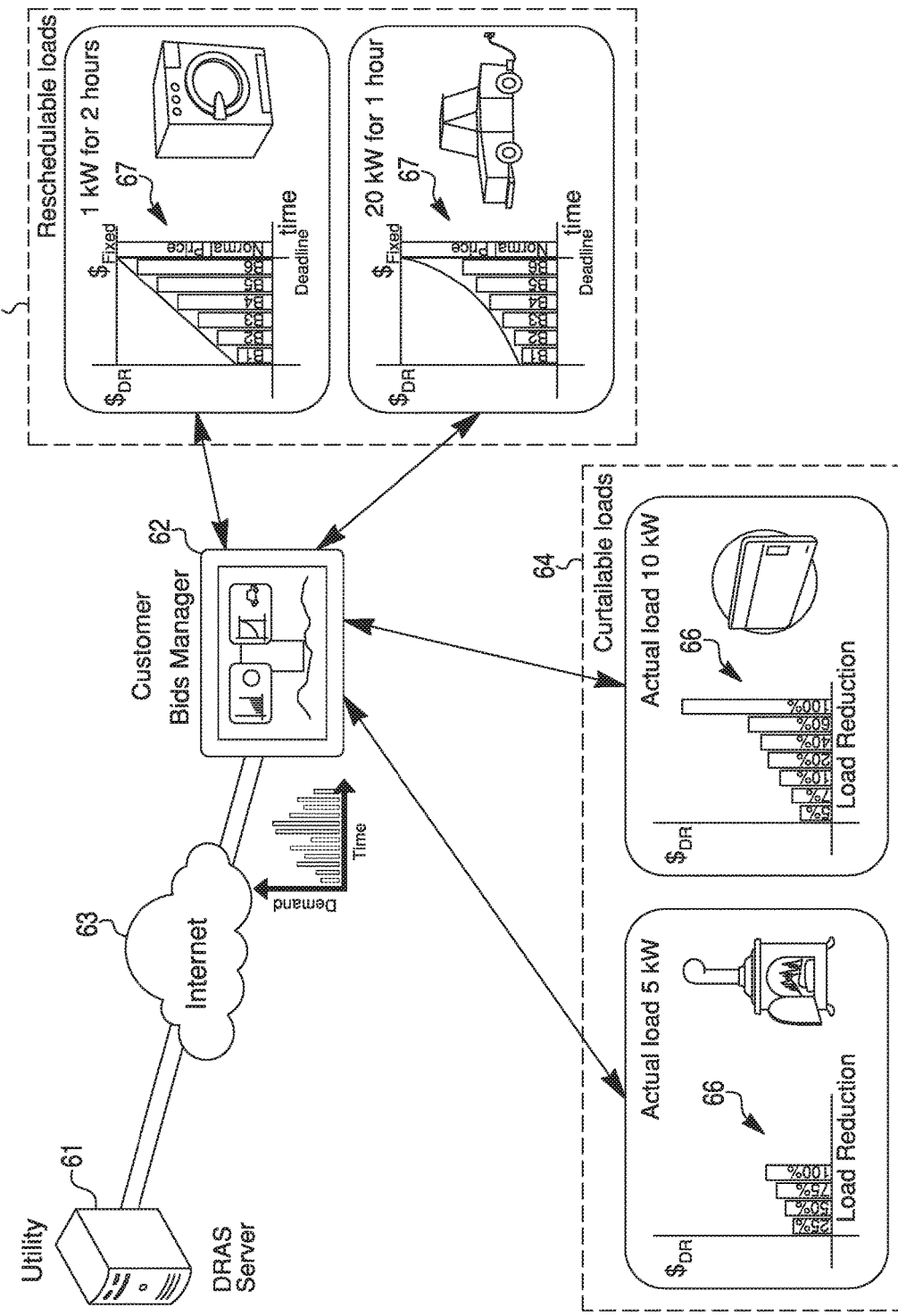
FIG. 15 is a diagram of an example infrastructure portion of demand response layout.

FIG. 15 is a diagram of an example infrastructure portion, e.g., demand response, of the present system. A DRAS server 61 at a utility may be connected to a customer bids manager 62 via a connection 63 such as, for example, an internet. Connection 63 may be one or more of various wire and wireless connections. Load information such as that of curtailable loads 64 and reschedulable loads 65 may be provided to customer bids manager 62. Curtailable loads 64 may incorporate, for example, actual loads such as 5 kW and 10 kW. The loads may be of various amounts, number and type. For each such load may be a schedule or graph 66 showing DR dollars ($\$_{DR}$) versus load reduction in terms of percent such as, for illustration, instances of 5, 7, 10, 20, 25, 40, 50, 60, 75 and 100 percent, relative to an actual load of 5 or 10 kW. The instances may be any other percentages.

Reschedulable loads 65 may incorporate, for example, loads such as 1 kW for 2 hours and 20 kW for one hour. The loads may be of any other amounts and durations. For each of such loads may be a schedule or graph 67 showing DR dollars versus time with increments of price along the time line. There may be a time deadline where the price ($\$_{DR}$) is stopped at a fixed level. The price at the fixed level may be, for instance, a normal price.

Figure 16:
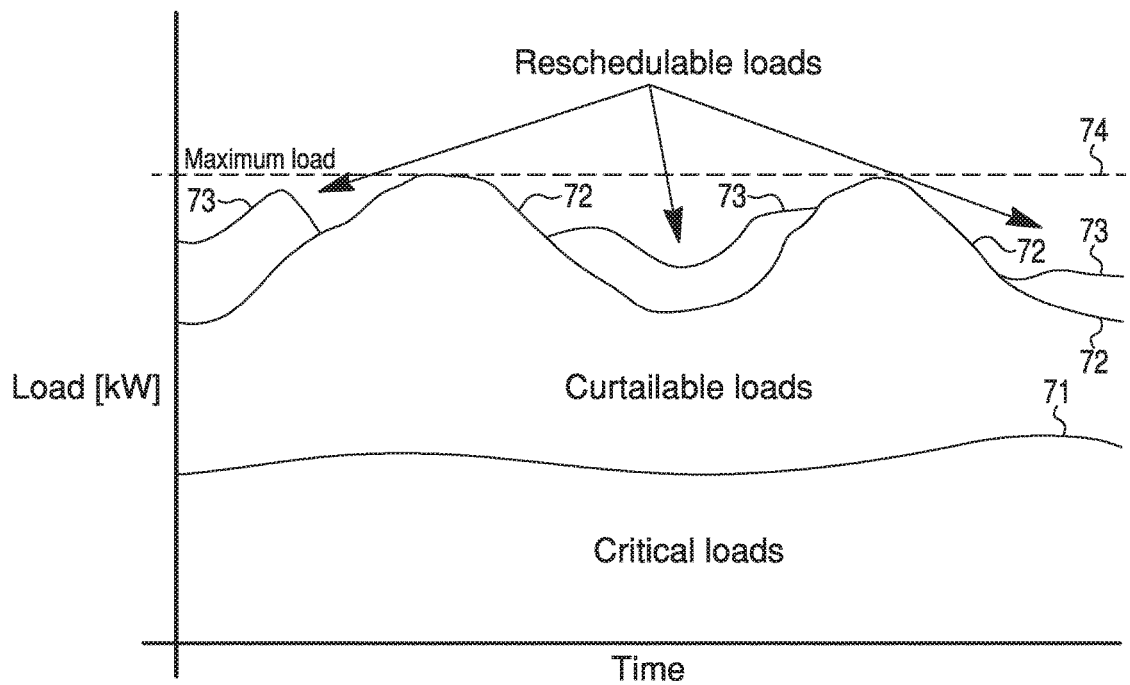
FIG. 16 is a diagram of an illustrative example of various power loads and their relationships.

FIG. 16 is a diagram of a graph showing load (e.g., kW) versus time. The graph is an illustrative example various loads and their relationships. The graph may show load curves for critical loads 71, curtailable loads 72 and reschedulable loads 73. A maximal load line 74 indicates a level that no load should exceed. Other graphs of various loads and their relationships may be had.

Before the each optimization procedure run, the algorithm should have the following items at its disposal. It may be noted that the solution described herein may just deal with static optimization, i.e., the optimization task is solved separately for each time slot (e.g., one hour) or a several time slots in row but with the no correlation between the slots being assumed. The present approach may be easily extended to solve a dynamic optimization problem (allowing inter-slot dependencies).

The items may incorporate the following. 1) A weather forecast for each DR participant (sharing weather resources may be exploited in advance). The probability distribution function, e.g., for OAT, may be estimated for a given time-slot. 2) Spot market price prediction for given time slot in a form of probability distribution function. It may be estimated based on the historical data. 3) Individual electrical energy demand models for each DR participating load. An example of global multivariate regression model (ToD=Time-of-Day could simulate the occupancy level which is not usually available) may be:

$$L = a_0 + a_1 \cdot OAT + a_2 \cdot ToD + a_3 \cdot ToD^2 + Accp \cdot DR,$$

where Accep is a bid acceptance status (binary) and DR is a general term representing the influence of demand response action. 4) Bids (nominations) from all potential DR participants, where each bid (load [kW] reduction/increase) may be a function of time slot and incentive expected. It may mean that multiple bids for the same time slot are allowed and participants are allowed to offer their own price in contrast to current incentive politics produced exclusively by utilities.

Figure 17:
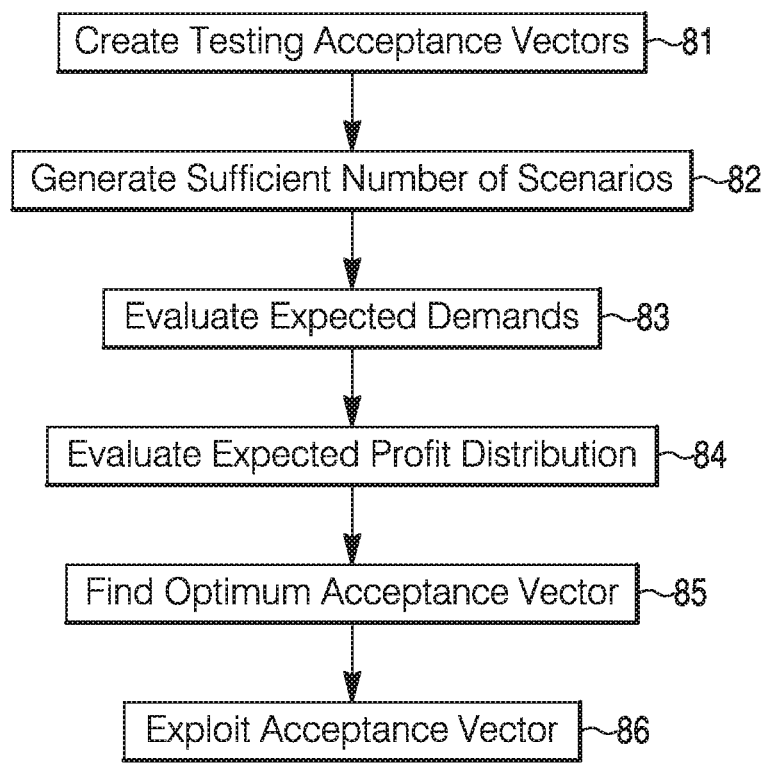
FIG. 17 is a diagram of an example optimization procedure.

FIG. 17 is a flow chart of an example optimization procedure. The optimization may be solved as a one time-slot (one step) or several time-slots ahead (multi-step). Symbol 81 indicates creating testing acceptance vectors. A set of eligible acceptance vectors/matrices may be created which is a subset of all possible combinations (2N for N DR participants). This process may select just vectors that are worthy to test, i.e., there is a high probability that would maximize the profit. A number of selection criteria may be generated, e.g., one may sort bids according to the price or participant reliability.

Symbol 82 indicates generating a sufficient number of scenarios. Create set of test scenarios (say 1000). Every scenario can be described by a vector (or matrix for multi-step) of values generated based on estimated (historical data based) probability distribution functions. Following the example load model, the random variables of the 3-participants scenario vector are generated based on distributions [P(price,P(OAT$_1$),P(OAT$_2$),P(OAT$_3$),P(DR$_1$|OAT$_1$),P(DR$_2$|OAT$_2$),P(DR$_3$|OAT$_3$)] where first term is the spot market price distribution, next three terms are distributions of outdoor air temperatures for given time-slot and last three terms are conditional distributions of load reduction/increase capabilities for given outdoor air temperatures.

Symbol 83 indicates evaluating expected demands. For every acceptance vector (selected in the first step) the expected total demand (sum of individual participants' demands) now may be evaluated against virtually all (e.g., 1000) scenarios (scenario=vector of realizations of random variables).

Symbol 84 indicates evaluating an expected profit distribution. Having the spot market price for each scenario and known penalty politics for exploiting the ancillary services (i.e., excessive power consumption), the expected profit may be evaluated for each scenario given the acceptance vector. It may be seen as a profit distribution over all testing scenarios for given acceptance vector.

Symbol 85 indicates finding an optimum acceptance vector. Profit distributions may then be evaluated for all testing acceptance vectors. The optimization may search for such an acceptance vector that maximizes the profit with the given required level of confidence (i.e., risk level). Note the set of testing acceptance vectors was found by the search procedure based on the bid ordering or on some other search approach (genetic algorithm) in the first step.

$$Acc* = \arg\max_{accep.vectors} (Profit(Demand(Acc), \text{Spot Market Price, Penalty}))$$

Symbol 86 indicates exploiting the acceptance vector. The optimum acceptance vector may then support the decisions about whom to accept the DR bid and when.

Figure 18:
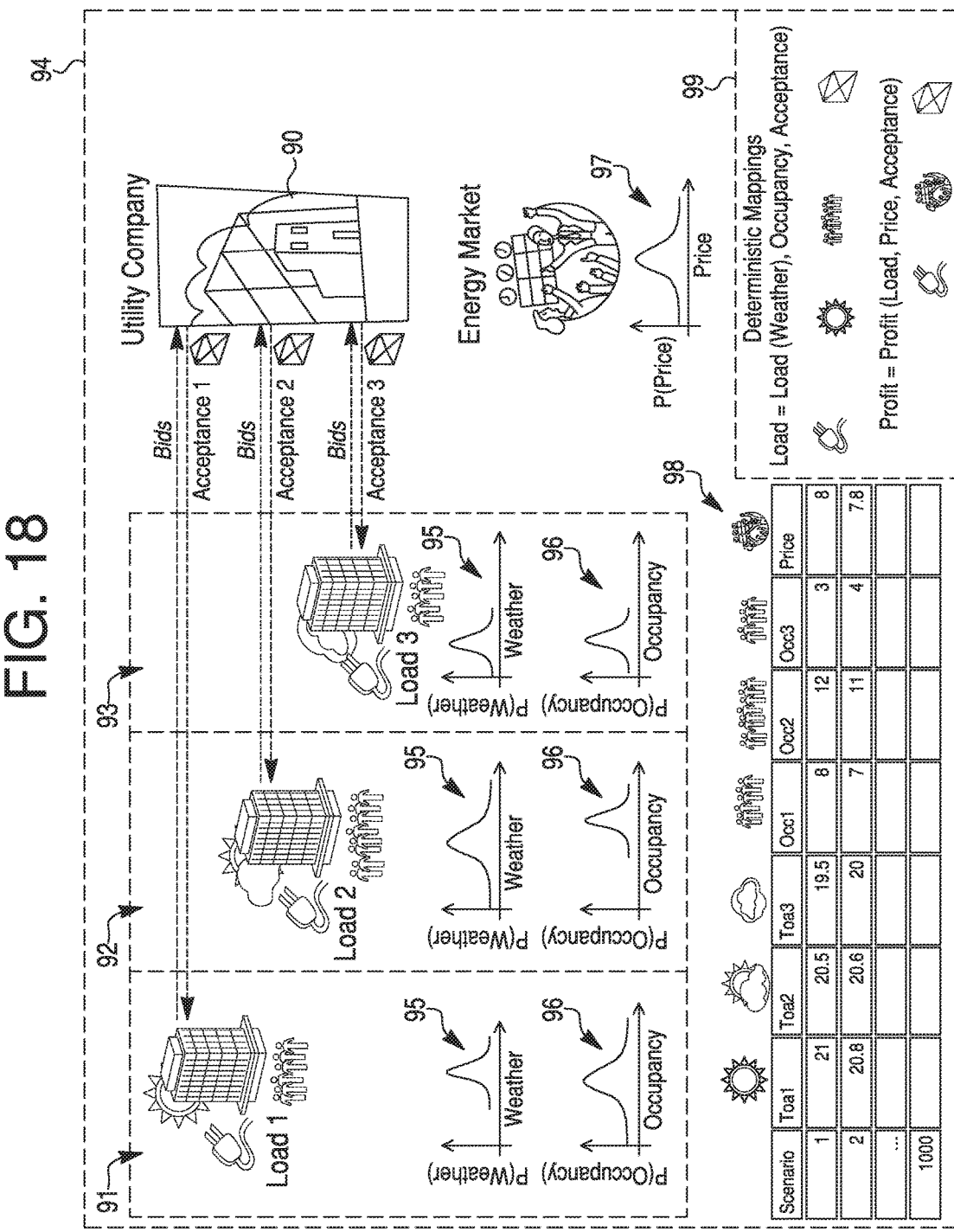
FIG. 18 is a diagram about evaluation of acceptance using various scenarios.

FIG. 18 is a diagram 94 about evaluation of acceptance using various scenarios. A utility company 90 may receive bids relative to a load 1 in column 91, load 2 in column 92 and load 3 in column 93. Acceptances 1, 2 and 3 may be provided by utility company 90 for loads 1, 2 and 3, respectively, in columns 91, 92 and 93, respectively. For each acceptance and scenario, the loads and profit may be known deterministically.

Deterministic mappings 99 may consist of: Load=Load (Weather,Occupancy,Acceptance) and Profit=Profit(Profit(Load,Price,Acceptance). There may be a histogram of profit for each acceptance.

Each column may have graphs 95 and 96 of P(Weather) versus Weather and of P(Occupancy) versus Occupancy, respectively. The energy market may be represented with a graph 97 of P(Price) versus Price.

A table 98 may show data for a number of scenarios for three situations with indications of Toa1, Toa2, Toa3, Occ1, Occ2 and Occ3. Price may be indicated for each scenario. In this example, weather may be determined by outside temperature Toa. If occupancy is not available, then it may be replaced by a time-of-day variable that is able to capture the occupancy profile sufficiently.

To recap, a system for optimizing a balance of power, may incorporate a first mechanism that decides about purchasing power from ancillary services, a second mechanism that purchases or sells power at a spot market, a third mechanism that purchases or sells power according to a demand response program, and a processor having a connection to the first, second and third mechanisms. The processor may process a reduction of a difference between purchased power of a supplier and demanded power of a consumer, by determining an amount of power bought and/or sold with one or more of the first, second and third mechanisms.

The difference between purchased power and demanded power may be minimized by forming an optimal power stack. The power stack may incorporate a mix having power via the demand response program, power at the spot market, and/or power from ancillary services. The processor may determine the mix of the power stack to minimize the difference between purchased power and demanded power.

The system may further incorporate an optimization sequence. The optimization sequence may incorporate maximizing profit and/or minimizing the difference between the purchased power and the demanded power.

Some terms may incorporate $P_{Load}$ as demanded power, $P_{Purchased}$ as purchased power, and $\Delta P$ as the difference between $P_{Load}$ and $P_{Purchased}$. Also, there may be $P_{DR} = \alpha \Delta P$, $P_{Spot} = \beta \Delta P$, and $P_{AS} = \chi \Delta P$. $\Delta P_{Correction}$ may incorporate $P_{DR}$, $P_{Spot}$ and $P_{AS}$. $\Delta P + \Delta P_{Correction} = 0$, and $\alpha + \beta + \chi \approx 1$ may be applicable.

α could be a discrete variable representing a magnitude of acceptance of the consumer in the demand response program. A power difference may be $\Delta P = P_{Load} - P_{Purchased}$. For a load greater than supply, $\Delta P - P_{DR} - P_{Spot} - P_{AS} = 0$ and $R(\Delta P) = R_{Load}(P) - R_{DR}(\alpha \Delta P) + R_{Spot}(\beta \Delta P) - R_{AS}(\chi \Delta P) - R_{Purchased}$. Also, $-P_{DR} - P_{Spot} - P_{AS} = \Delta P_{Correction}$, $R(\Delta P)$ may be profit, $R_{Load}(P)$ may be a price of the load, and $R_{DR}(\alpha \Delta P)$ may be a price of power determined between the utility and the consumer in a demand response relationship. Also, $P_{Spot}(\beta \Delta P)$ may be a price of power on an open market, and $R_{AS}(\chi \Delta P)$ may be a price of power from a system operator providing ancillary services at a set price. One may have $\alpha + \beta + \chi \approx 1$, and $$\max_{\alpha,\beta,\chi \in \langle 0;1 \rangle} R(P, \Delta P)$$

for optimization.

A power difference may be $\Delta P = P_{Load} - P_{Purchased}$. For a load less than supply, there may be $\Delta P + P_{DR} + P_{Spot} + P_{AS} = 0$ and $R(\Delta P) = R_{Load}(P) - R_{DR}(\alpha \Delta P) - R_{Spot}(\beta \Delta P) - R_{AS}(\chi \Delta P) - R_{Purchased}$. There may be $P_{DR} + P_{Spot} + P_{AS} = \Delta P_{Correction}$. $R(\Delta P)$ may be profit, and $R_{Load}(P)$ may be a price of the load. $R_{DR}(\alpha \Delta P)$ may be a price of power determined between the utility and the consumer in a demand response relationship. $R_{Spot}(\beta \Delta P)$ may be a price of power on an open market, and $R_{AS}(\chi \Delta P)$ may be a price of power from a system operator providing ancillary services at a set price. One may have $\alpha + \beta + \chi \approx 1$, and $$\max_{\alpha,\beta,\chi \in \langle 0;1 \rangle} R(P, \Delta P)$$

for optimization.

A system for managing energy, may incorporate a server, a virtual energy marketing (VEM) module connected to the server, a utility energy source connected to the VEM module, a meter data management (MDM) database connected to the VEM module, an energy consumer connected to the server and the MDM database, and an energy market source connected to the VEM module.

The VEM module may incorporate a decision engine connected to the utility energy source and the server, a scenario generator connected to the decision engine, a forecaster mechanism connected to the scenario generator and the MDM database, and a probability distribution generator connected to the forecaster, the energy market database and the weather forecast database. The system for managing energy may further incorporate a weather forecast database connected to the probability distribution generator.

The utility may provide information about power unbalance between loaded power and purchased power and/or grid status to the decision engine. Demand response signals and business information may be exchanged between the consumer and the server. The decision engine may provide optimal timing and selection of demand response resources to the server. The consumer may provide energy consumption data to the MDM database. The forecaster may receive selected relevant data from the MDM database. The energy market source may provide a market price to the probability distribution generator.

The system may further incorporate a weather forecast database connected to the probability distribution generator. The weather forecast database may provide weather parameters to the probability distribution generator. The server may be a demand response automation server.

An approach for coordinating power transactions, may incorporate finding out an amount of purchased power of a utility, finding out an amount of demanded power by a consumer, minimizing a power difference between an amount of purchased power of the utility and an amount of demanded power by the consumer, minimizing the power difference that depends on, at least in part, purchasing power from a system operator providing ancillary services at a set price, selling or purchasing power on the open market at market price, and/or selling or purchasing power at a price determined between the utility and the consumer in a demand response relationship.

The power difference may be between an amount of purchased power of the utility and an amount of demanded power by the consumer, with optimizing a combination of $P_{Spot}$, $P_{AS}$ and $P_{DR}$. Goals of optimizing the combination may incorporate maximizing profit to the utility and minimizing the power difference.

$\alpha \Delta P$, $\beta \Delta P$ and $\chi \Delta P$ may represent portions of the respective power that constitute the power difference between the amount of purchased power of the utility and the amount of demanded power by the consumer. Parameters $\alpha$, $\beta$ and $\chi$ may be determined to minimize the power difference, where $\alpha + \beta + \chi \approx 1$.

In the approach, the power difference may be $\Delta P = P_{Load} - P_{Purchased}$. For a load greater than supply, $\Delta P - P_{DR} - P_{Spot} - P_{AS} = 0$ and $R(\Delta P) = R_{Load}(P) - R_{DR}(\alpha \Delta P) + R_{Spot}(\beta \Delta P) - R_{AS}(\chi \Delta P) - R_{Purchased}$. There may be $-P_{DR} - P_{Spot} - P_{AS} = \Delta P_{Correction}$. $R(\Delta P)$ may be profit, and $R_{Load}(P)$ may be a price of the load. $R_{DR}(\alpha \Delta P)$ may be a price of power determined between the utility and the consumer in a demand response relationship. $R_{Spot}(\beta \Delta P)$ may be a price of power on an open market. $R_{AS}(\chi \Delta P)$ may be a price of power from a distribution company providing ancillary services at a set price, and $\alpha + \beta + \chi \approx 1$.

The power difference may be $\Delta P = P_{Load} - P_{Purchased}$. For a load less than supply, $\Delta P + P_{DR} + P_{Spot} + P_{AS} = 0$ and $R(\Delta P) = R_{Load}(P) - R_{DR}(\alpha \Delta P) - R_{Spot}(\beta \Delta P) - R_{AS}(\chi \Delta P) - R_{Purchased}$. There may be $P_{DR} + P_{Spot} + P_{AS} = \Delta P_{Correction}$. $R(\Delta P)$ may be profit. $R_{Load}(P)$ may be a price of the load. $R_{DR}(\alpha \Delta P)$ may be a price of power determined between the utility and the consumer in a demand response relationship. $R_{Spot}(\beta \Delta P)$ may be a price of power on an open market. $R_{AS}(\chi \Delta P)$ may be a price of power from a distribution company providing ancillary services at a set price, and $\alpha + \beta + \chi \approx 1$.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for optimizing a balance of power for a power utility company, comprising:

a demand response automation server having a processor;

a first mechanism connected to the processor, wherein the first mechanism affects supply of power by deciding about purchasing power from ancillary services;

a second mechanism connected to the processor, wherein the second mechanism affects supply of power by purchasing or selling power at a spot market;

a third mechanism connected to the processor, where the third mechanism influences a demand for power according to a demand response program between the power utility company and a customer;

wherein the processor processes a reduction of a difference between purchased power of the power utility company and demanded power of the customer, by determining an amount of power bought and/or sold with one or more of the first, second and third mechanisms;

wherein the processor makes a demand response action including providing a demand response signal to a device of the customer to change the power load of the customer and influence demand for power from the power utility company based, at least in part, on the difference between purchased power of the power utility company and demanded power of the customer, wherein the difference between purchased power and demanded power is minimized by forming an optimal power stack, the optimal said power stack comprises a mix having power via the demand response program, power at the spot market, and/or power from ancillary services, the demand response automation server determining the mix of the power stack; and the device changing the power load of the customer and influencing demand for power from the power utility company in response to the demand response signal.

2. The system of claim 1, further comprising:
an optimization sequence; and
wherein the optimization sequence comprises maximizing profit and/or minimizing the difference between the purchased power and the demanded power.

3. The system of claim 1, wherein:
$P_{Load}$ is demanded power;
$P_{Purchased}$ is purchased power; and
$\Delta P$ is the difference between $P_{Load}$ and $P_{Purchased}$.

4. The system of claim 3, wherein:
$P_{DR} = \alpha \Delta P$;
$P_{Spot} = \beta \Delta P$;
$P_{AS} = \chi \Delta P$;
$\Delta P_{Correction}$ comprises $P_{DR}$, $P_{Spot}$ and $P_{AS}$;
$\Delta P + \Delta P_{Correction} = 0$; and
$\alpha + \beta + \chi \approx 1$;
where:
$\Delta P$ represents a difference between demanded power and purchased power;
$P_{DR}$ represents a difference between demanded power and purchased power for demand response power;
$P_{Spot}$ represents a difference between demanded power and purchased power for spot power;
$P_{AS}$ represents a difference between demanded power and purchased power for ancillary power;
$\alpha$, $\beta$ and $\chi$ are parameters determined to minimize $\Delta P$.

5. The system of claim 4, wherein $\alpha$ could be a discrete variable representing a magnitude of acceptance of the customer in the demand response program.

6. The system of claim 3, wherein:
a power difference is $\Delta P = P_{Load} - P_{Purchased}$;
for a load greater than supply, $\Delta P - P_{DR} - P_{Spot} - P_{AS} = 0$ and
$R(\Delta P) = R_{Load}(P) - R_{DR}(\alpha \Delta P) + R_{Spot}(\beta \Delta P) - R_{AS}(\chi \Delta P) - R_{Purchased}$;
$-P_{DR} - P_{Spot} - P_{AS} = \Delta P_{Correction}$;
$R(\Delta P)$ is profit;
$R_{Load}(P)$ is a price of the load;
$R_{DR}(\alpha \Delta P)$ is a price of power determined between the power utility company and the customer in a demand response relationship;
$R_{Spot}(\beta \Delta P)$ is a price of power on an open market;
$R_{AS}(\chi \Delta P)$ is a price of power from a system operator providing ancillary services at a set price;
$\alpha + \beta + \chi \approx 1$; and $$\max_{\alpha, \beta, \chi \in (0;1)} R(P, \Delta P)$$

for optimization.

7. The system of claim 3, wherein:
a power difference is $\Delta P = P_{Load} - P_{Purchased}$;
for a load less than supply, $\Delta P + P_{DR} + P_{Spot} + P_{AS} = 0$ and
$R(\Delta P) = R_{Load}(P) - R_{DR}(\alpha \Delta P) - R_{Spot}(\beta \Delta P) - R_{AS}(\chi \Delta P) - R_{Purchased}$;
$P_{DR} + P_{Spot} + P_{AS} = \Delta P_{Correction}$;
$R(\Delta P)$ is profit;
$R_{Load}(P)$ is a price of the load;
$R_{DR}(\alpha \Delta P)$ is a price of power determined between the power utility company and the customer in a demand response relationship;
$R_{Spot}(\beta \Delta P)$ is a price of power on an open market;
$R_{AS}(\chi \Delta P)$ is a price of power from a system operator providing ancillary services at a set price;
$\alpha + \beta + \chi \approx 1$; and $$\max_{\alpha, \beta, \chi \in (0;1)} R(P, \Delta P)$$

for optimization.

* * * * *